(12) United States Patent
Ohm

(10) Patent No.: US 9,592,641 B2
(45) Date of Patent: Mar. 14, 2017

(54) TIRE SEALANT BOTTLE ASSEMBLY

(71) Applicant: Bell Automotive Products, Inc., Scottsdale, AZ (US)

(72) Inventor: Patrick Ohm, Mesa, AZ (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 62 days.

(21) Appl. No.: 14/338,236

(22) Filed: Jul. 22, 2014

(65) Prior Publication Data

US 2016/0023412 A1 Jan. 28, 2016

(51) Int. Cl.
*B29C 73/16* (2006.01)
*B29L 30/00* (2006.01)

(52) U.S. Cl.
CPC ......... *B29C 73/166* (2013.01); *B29L 2030/00* (2013.01)

(58) Field of Classification Search
CPC ... B29C 73/16; B29C 73/166; B29L 2030/00; B60C 25/16
USPC ....... 141/37, 67, 68, 95, 114, 177, 183, 312, 141/313, 314, 319, 363; 152/415; 156/95; 222/107, 566, 568
See application file for complete search history.

(56) References Cited

U.S. PATENT DOCUMENTS

| 3,718,057 | A | 2/1973 | Berchtold | |
| 9,242,416 | B1* | 1/2016 | Ohm | B29C 73/166 |
| 2006/0021472 | A1* | 2/2006 | Ragan | B29C 73/166 81/15.6 |
| 2006/0162501 | A1* | 7/2006 | Ragan | B29C 73/166 81/15.6 |
| 2006/0175360 | A1 | 8/2006 | Greenall | |
| 2007/0169326 | A1* | 7/2007 | Smith | B65D 51/24 29/221.5 |
| 2014/0373974 | A1* | 12/2014 | Ragan | B60C 25/16 141/114 |
| 2016/0023412 | A1* | 1/2016 | Ohm | B29C 73/166 141/7 |

* cited by examiner

*Primary Examiner* — Timothy L Maust
*Assistant Examiner* — Andrew Schmid
(74) *Attorney, Agent, or Firm* — Booth Udall Fuller, PLC

(57) ABSTRACT

A tire sealant bottle assembly that includes a bottle, a nozzle, and a cap is disclosed. The bottle is designed to hold tire sealant therein. The nozzle removably couples to the bottle and includes a nozzle base, a nozzle head integral with the nozzle base, and a channel extending through the nozzle. The channel includes a substantially cylindrical portion at the terminating end of the nozzle head that is at least 5 mm in length and has an inner diameter between approximately 7 and 8 mm. The cap may be a hollow valve core tool cap having an open first end, a closed second end, and a valve core removal tool extending from the second end away from the first end.

21 Claims, 5 Drawing Sheets

TIRE SEALANT BOTTLE ASSEMBLY

BACKGROUND

1. Technical Field

Aspects of this document relate generally to tire sealant bottle assemblies.

2. Background Art

Tire sealant in unpressurized bottles is a simple and quick way for a user to seal a hole in a tire. Conventional tire sealant bottle assemblies require a flexible hose that extends between the nozzle of the bottle and the stem of the tire. Kinking, clogging, and messy hoses are problematic for these hoses during and after use.

SUMMARY

According to one aspect a tire sealant bottle assembly may comprise a bottle comprising tire sealant housed therein and a bottle head, a nozzle comprising a nozzle base configured to removably couple to the bottle head, a nozzle head integral with the nozzle base and comprising a terminating end opposite the nozzle base, an inner surface within the nozzle forming a channel that extends through the terminating end, wherein the channel comprises a substantially cylindrical portion at the terminating end of the nozzle head and the substantially cylindrical portion comprises an inner diameter sized such that the inner surface of the cylindrical portion at least partially interfaces with threading of a tire stem when the tire stem is inserted into the substantially cylindrical portion of the nozzle head, and a cap removably coupled to the nozzle head.

Embodiments of a tire sealant bottle assembly may comprise one or more of the following. The cap may comprise a hollow valve core tool cap comprising an open first end, a closed second end, and a valve core removal tool extending from the second end away from the first end, wherein at least a portion of the nozzle head extends into the hollow valve core tool cap through the open first end. A retainer ring on the nozzle head engaged with an annular depression on an inner surface of the hollow valve core tool. Valve cap threading positioned on the valve core tool cap between the closed second end and the valve core removal tool, and an indicator valve cap removably coupled to the valve cap threading of the valve core tool cap, the indicator valve cap configured to removably couple the tire stem. One or more finger grips disposed on the valve core removal tool. The cylindrical portion of the channel may be at least 5 mm in length. The cylindrical portion of the channel may be at least 3 cm in length and is uniform through the nozzle head. The nozzle head may comprise a collapsible nozzle head. The inner diameter of the substantially cylindrical portion of the channel may be between approximately 7 and 8 mm. The inner diameter of the substantially cylindrical portion of the channel may be approximately 7.5-7.65 mm.

According to another aspect, a tire sealant bottle assembly may comprise a bottle comprising tire sealant housed therein and a bottle head, a nozzle removably coupled to the bottle head and comprising a nozzle base, a nozzle head integral with the nozzle base and comprising a terminating end opposite the nozzle base, and a channel extending through the nozzle, the channel comprising a substantially cylindrical portion at the terminating end that is at least 5 mm in length and comprises an inner diameter between approximately 7 and 8 mm, and a cap removably coupled to the nozzle head.

Embodiments of a tire sealant bottle assembly may comprise one or more of the following. The cap may comprise a hollow valve core tool cap comprising an open first end, a closed second end, and a valve core removal tool extending from the second end away from the first end, wherein at least a portion of the nozzle head extends into the hollow valve core tool cap through the open first end. A retainer ring on the nozzle head engaged with an annular depression on an inner surface of the hollow valve core tool. Valve cap threading positioned on the valve core tool cap between the closed second end and the valve core removal tool, and an indicator valve cap removably coupled to the valve cap threading of the valve core tool cap, the indicator valve cap configured to removably couple the tire stem. One or more finger grips disposed on the valve core removal tool. The cylindrical portion of the channel may be at least 3 cm in length and is uniform through the nozzle head. The nozzle head may comprise a collapsible nozzle head. The inner diameter of the substantially cylindrical portion of the channel may be approximately 7.5-7.65 mm.

According to another aspect, a method of inserting a tire sealant into a tire may comprise removing a valve core from a tire stem of a tire, inserting a threaded portion of the tire stem into a substantially cylindrical portion of a channel in a nozzle head of a nozzle, the nozzle comprising a nozzle base integral with the nozzle head and removably coupled to a bottle comprising tire sealant housed therein, transferring tire sealant from the bottle through the nozzle base, the nozzle head, and the tire stem and into the tire by squeezing the bottle, and drawing air into the bottle between the threaded portion of the tire stem and the cylindrical portion of the channel to replace the tire sealant previously housed within the bottle and transferred into the tire with air from outside the bottle.

Embodiments of a tire sealant bottle assembly may comprise one or more of the following. Removing the valve core from the tire stem of the tire may comprise removing the valve core from the tire stem of the tire with a valve core removal tool extending from a closed end of a hollow valve core tool cap, the valve core tool cap comprising a an open end opposite the closed end and configured to removably couple to the nozzle head. The nozzle head may comprise a retractable nozzle head and the method further comprises extending the retractable nozzle head.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended tire sealant bottle assembly and/or assembly procedures for a tire sealant bottle assembly will become apparent for use with implementations of tire sealant bottle assemblies from this disclosure. Accordingly, for example, although particular bottles, nozzles, and caps are disclosed, such bottles, nozzles, and caps and implementing components may comprise any shape, size, style, type, model, version, measurement, concentration, material, quantity, and/or the like as is known in the art for such tire sealant bottle assemblies and implementing components, consistent with the intended operation of a tire sealant bottle assembly.

Conventional tire sealants housed in an unpressurized bottle typically require a flexible hose to transfer tire sealant from the bottle to the tire stem. Tire sealant remaining in the hose will often dry and/or clog the hose. As shall be shown and described in greater detail throughout this document, various embodiments of the assemblies contemplated as part of this disclosure are advantages to those previously known in the art because the nozzle head is integral with the nozzle base, the nozzle base being coupled directly to the bottle. Configurations of the nozzle contemplated herein allow for easier and more efficient transfer of tire sealant from the bottle to the tire stem, as well as reuse of the nozzle at a later time.

Figure 1:
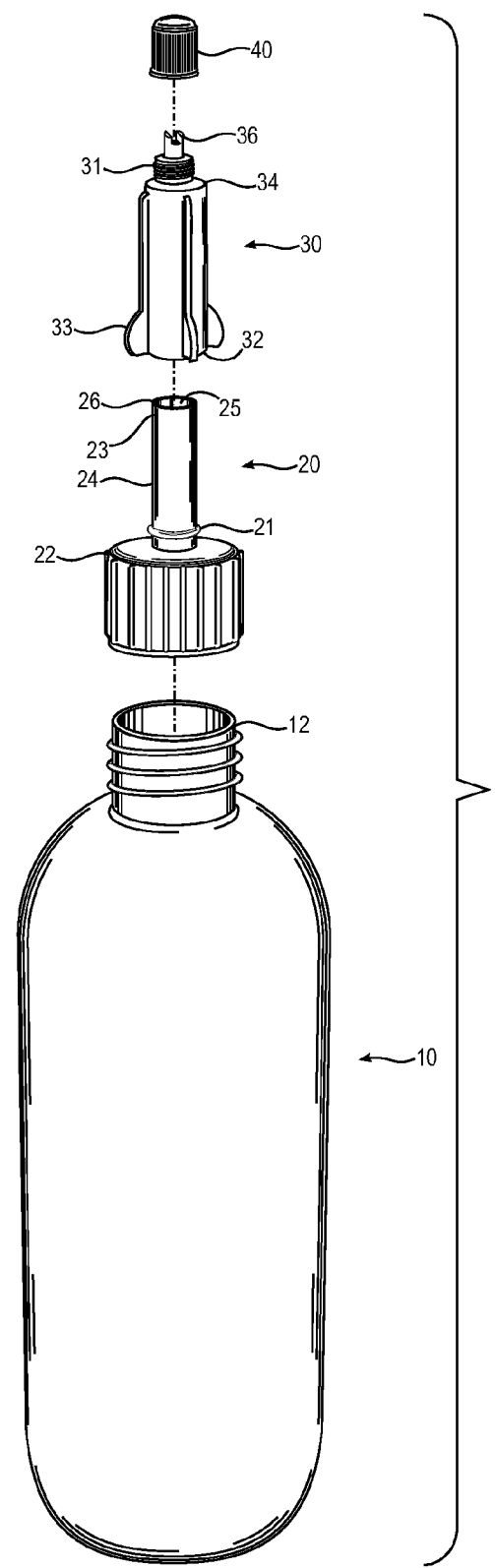
FIG. 1 is a break apart view of tire sealant bottle assembly.

FIG. 1 depicts a non-limiting exploded view of a tire sealant bottle assembly. According to one aspect, a tire sealant bottle assembly comprises a bottle 10, a nozzle 20, a valve core tool cap 30, and an indicator valve cap 40. In some embodiments, each and every one of the bottle 10, nozzle 20, valve core tool cap 30, and indicator valve cap 40 may not be required. The bottle 10 may comprise any bottle known in the art, and is not limited to the bottle 10 depicted in FIG. 1. The bottle 10 typically comprise bottle head 12 configured to removably couple to the nozzle 20. Removable coupling of the bottle 10 and the nozzle 20 at the bottle head 12 may be via threaded coupling, snap-fit coupling, or any other coupling known in the art.

Embodiments of a nozzle 20 typically comprise a nozzle base 22 and a nozzle head 24. The nozzle base 24 is configured to removably couple to the bottle head 12 of the bottle 10. In one or more embodiments, the nozzle head 24 is integral with the nozzle base 22. The nozzle head 24 comprises a terminating end 26 opposite the nozzle base 22. According to some aspects, the terminating end 26 comprises an open terminating end 26. A channel 25 extending through the nozzle head 24 allows fluid communication between the terminating end 26 of the nozzle head 24 and the interior of the bottle 10 when the nozzle 20 is coupled to the bottle 10. An inner surface of 28 of the nozzle head 24 typically forms the channel 25 that extends through the nozzle head 24.

In one or more embodiments of a nozzle 20, the channel comprises a substantially cylindrical portion 23 at the terminating end 26 of the nozzle head 24. The substantially cylindrical portion 23 may extend from the terminating end 26 all the way to the nozzle base 22, as shown in the non-limiting embodiment depicted in FIG. 1. Alternatively, the substantially cylindrical portion 23 of the nozzle head 24 may extend only part way from the terminating end 26 to the nozzle base 22. According to one aspect, the substantially cylindrical portion 23 is at least 5 mm in length. According to another aspect, the substantially cylindrical portion 23 is at least 3 cm in length.

Figure 5:
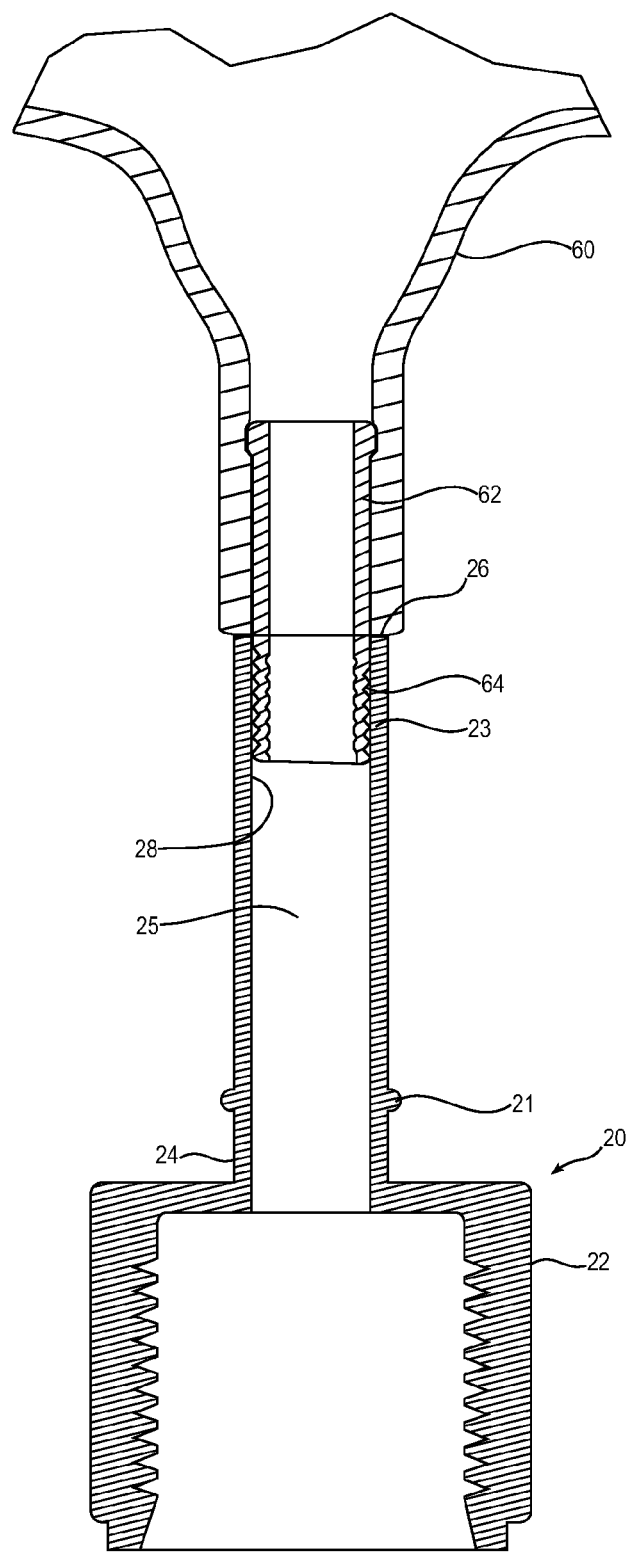
FIG. 5 is a cross-sectional view of cylindrical portion of a nozzle fitted over a threaded portion of a tire stem of a tire.

The substantially cylindrical portion 23 is typically sized such that it can fit over the threaded portion 64 of a tire stem 62 (shown in FIG. 5), allow transfer of tire sealant from the bottle 10, through the nozzle head 24, through the tire stem 62, and into the tire 60 without losing a significant amount, if any, of tire sealant between the threaded portion 64 of the tire stem 62 and the inner surface 28 of the substantially cylindrical portion 23. The substantially cylindrical portion is also sized such that air may be drawn into the bottle 10 through the threaded portion 64 of the tire stem 62 after tire sealant is squeezed from the bottle 10 into the tire 60. Standard tire valve stems 62 are 0.305"-32, where 0.305" is the major external thread diameter and 32 is the threads/inch, a thread pitch of 0.03125", and a minor diameter of 0.271". The substantially cylindrical portion 23 may be sized to fit over a standard tire valve stem or any tire valve stem known in the art. According to one aspect, the substantially cylindrical portion 23 of the channel 25 comprises an inner diameter 29 of between approximately 7 and approximately 8 mm. According to another aspect, the substantially cylindrical portion 23 of the channel 25 comprises an inner diameter 29 of approximately 7.5-7.65 mm.

Figure 2:
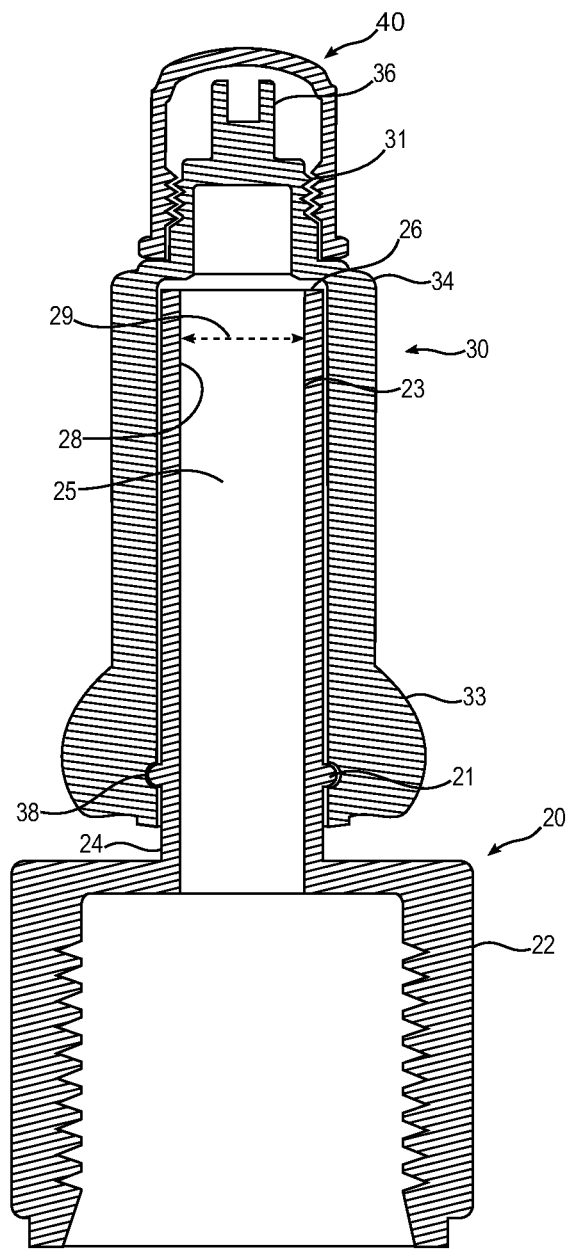
FIG. 2 is a cross sectional view of a first embodiment of a nozzle coupled to a valve core tool cap and an indicator valve cap.

As shown in FIG. 1 and the cross sectional view of FIG. 2, one or more embodiments of a nozzle 20 comprise a retainer ring 21. The retainer ring 21 is positioned to engage with an annular depression 38 on the valve core tool cap 30 to snap fit and removably couple the valve core tool cap 30 to the nozzle 20. FIG. 2 depicts a cross sectional view of a valve core tool cap 30 removably coupled to a nozzle 20, with the retainer 21 and annular depression being engaged with one another during coupling. In other embodiment, removably coupling of the valve core tool cap 30 to the nozzle 20 may be through any coupling known in the art, such as but not limited threaded coupling. It is also contemplated that while the at least a portion of the channel 25 of the nozzle 20 is substantially cylindrical in shape, the exterior of the nozzle head 24 may comprise any shape, such as but not limited to a cone, a cylinder, and the like.

Figure 3:
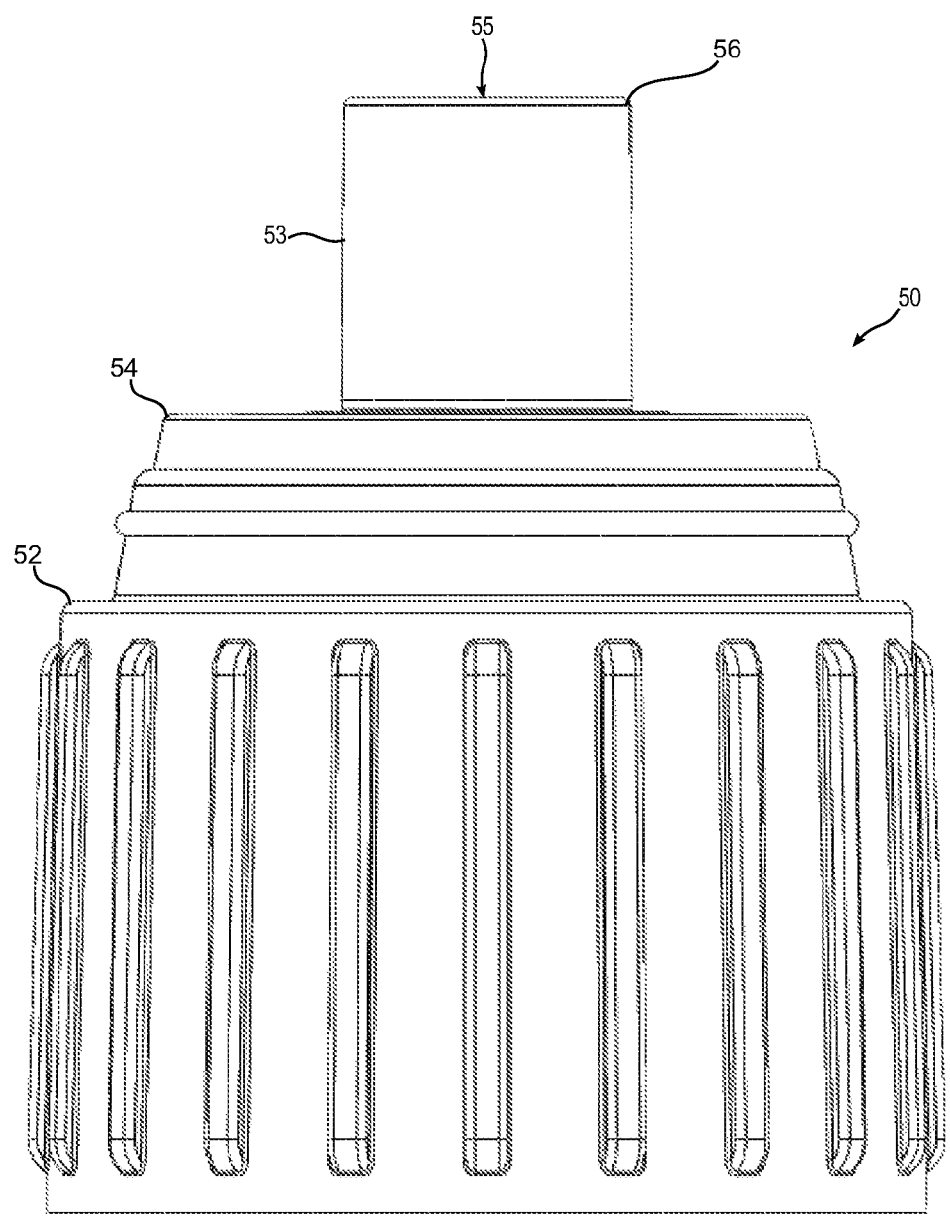
FIG. 3 is a side view of a second embodiment of a nozzle in a collapsed position.
Figure 4:
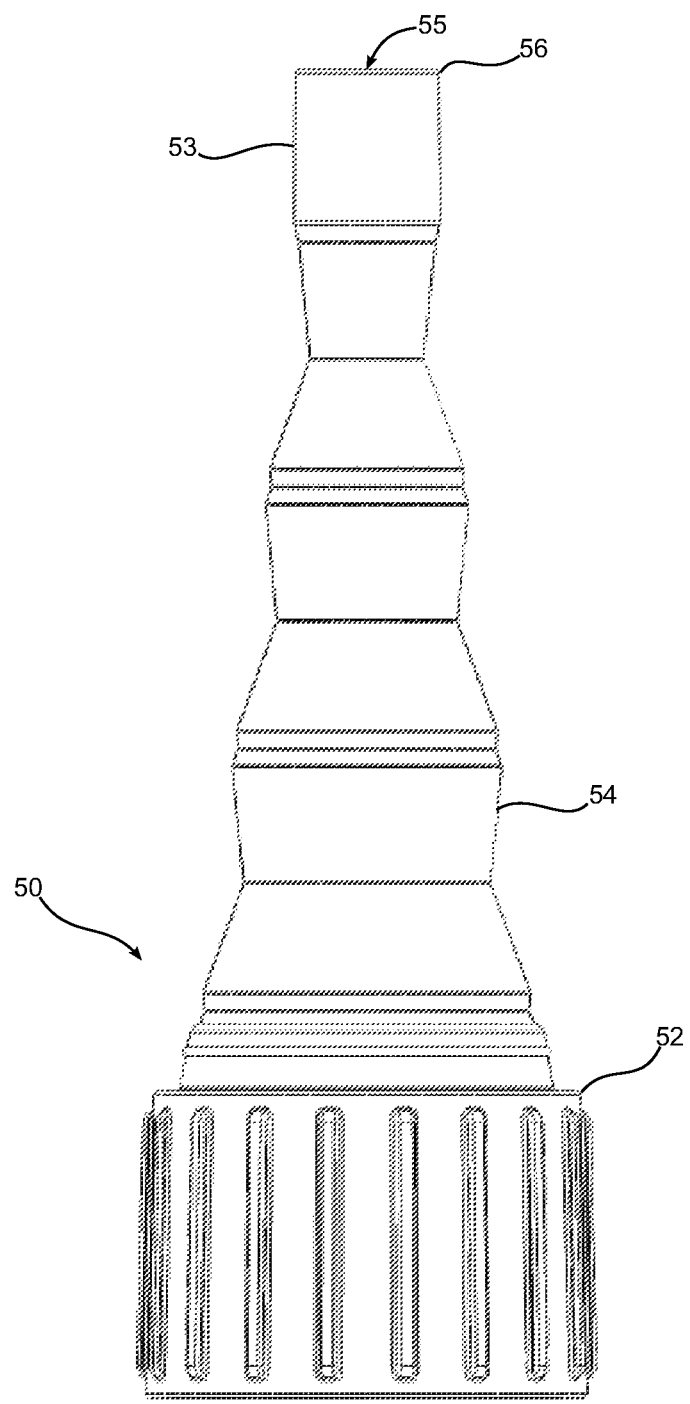
FIG. 4 is a side view of a second embodiment of a nozzle in an extended position.

FIGS. 3 and 4 depict another, non-limiting embodiment of a nozzle 50. In one or more embodiments, the nozzle 50 comprises an adjustable nozzle 50 that is adjustable between a retracted position (shown in FIG. 3) and an extended position (shown in FIG. 4). Similar to other nozzle embodiments described herein, the nozzle 50 comprises a nozzle base 52 configured to removably couple to the bottle 10.

The nozzle 50 also further comprises a nozzle head 54 integral with and extending from the nozzle base 52, the nozzle head 54 comprising a terminating end 56 opposite the nozzle base 52 and a channel 55 extending through the nozzle head 54. The channel 55 is similar to the channel 25 in that it is formed by an inner surface of the nozzle head 54 and comprises a substantially cylindrical portion 53 at the terminating end 56 of the nozzle head 54. Contrary to other embodiments, however, the substantially cylindrical portion 53 of the channel 55 of the nozzle 50 only extends from the terminating end 56 part way to the nozzle base 52. In one or more embodiments, the substantially cylindrical portion 53 is at least 5 mm in length. Also similar to other embodiments, the substantially cylindrical portion 53 of the channel 55 comprises an inner diameter sized to fit over the threaded portion of a tire stem, as previously described. The inner diameter of the substantially cylindrical portion 53 of the channel is between approximately 7 mm and approximately 8 mm. More particularly, the inner diameter of the substantially cylindrical portion 53 may be approximately 7.5-7.65 mm.

Positioned between the substantially cylindrical portion 53 and the nozzle base 52 is a collapsible portion of the nozzle head 54. The collapsible portion of the nozzle head 52 may comprise any collapsible configuration, such as but not limited to an accordion-like collapsible portion. In the particular non-limiting embodiment depicted in FIGS. 3 and 4, the collapsible portion is substantially conical in shape. In other embodiments, the collapsible portion may be substantially cylindrical in shape. In various embodiments, the collapsible portion is flexible when in the extended position, thus allowing for easier transfer of tire sealant from the bottle 10 to the tire stem. Although not shown in FIGS. 3 and 4, the nozzle 50 may further comprise a retainer ring 21 similar to that shown in association with the nozzle 50.

In still other embodiments, the nozzle 50 comprises only a nozzle base 52 having an opening extending therethrough in alternative to a nozzle head 20. In such embodiments, the opening on the nozzle base 52 may be sized similarly to the inner diameter of the cylindrical portion of the nozzle head 54. For example, in one embodiment, the opening comprises a substantially cylindrical opening comprising a diameter of between approximately 7 mm and approximately 8 mm. More particularly, the opening may comprise a diameter of approximately 7.5-7.65 mm. In yet another embodiment, the nozzle head 54 may extend inwardly toward the bottle 10 rather than protruding outwardly away from the bottle 10. A nozzle head 54 extending inwardly may comprise any of the dimensions described in relation to previous embodiments.

One or more embodiments of a tire sealant bottle assembly further comprise a valve core tool cap 30. Although the non-limiting embodiments shown in FIGS. 1 and 2 depict a valve core tool cap 30 with a nozzle 20, it is also contemplated as part of this disclosure that a valve core tool cap 30 may be utilized with nozzle 20. Use of a valve core tool cap 30 with a nozzle 50 may or may not require modification that will become apparent to one skilled in the art upon review of this disclosures of this document.

Embodiments of a valve core tool cap 30 typically comprise an open first end 32 and a closed second end 34. According to one aspect, the valve core tool cap 30 is substantially hollow, with a chamber formed within the valve core tool cap 30. The chamber may extend between the open first end 32 and the closed second end 34. The open first end 32 and the chamber are sized such that at least a portion of a nozzle head 24 may be inserted into the open first end 32 and the chamber in one or more embodiments. More particularly, when the valve core tool cap 30 is removably coupled to the nozzle 20, at least a portion of the nozzle head 24 is housed within the chamber of the hollow valve core tool cap 30. Even more particularly, the substantially cylindrical portion 23 of the channel 25 is housed within the chamber of the hollow valve core tool cap 30 in some embodiments when the valve core tool cap 30 is removably coupled to a nozzle 20.

FIG. 2 depicts a cross-sectional view of a non-limiting embodiment of a valve core tool cap 30 removably coupled to a nozzle 20. According to one aspect, the valve core tool cap 30 comprises an annular depression 38. The annular depression 38 is typically positioned to engage with the retainer ring 21 on the nozzle 20 when the valve core tool cap 30 is removably coupled to the nozzle 20.

One or more embodiments of a valve core tool cap 30 comprise a valve core removal tool 36. The valve core removal tool 36 is typically positioned on the outside of the valve core tool cap 30 on the closed second end 34 extending away from the open first end 32. The valve core removal tool 36 may comprise any valve core removal tool known in the art. According to one aspect, the valve core removal tool 36 comprises a cylinder having a slot at a terminating end.

One or more embodiments of a valve core tool cap 30 further comprise valve cap threading 31. The valve cap threading 31 is typically positioned on the exterior of the valve core tool cap 30 between the valve core removal tool 36 and the closed second end 34. In other embodiments, however, the valve cap threading 31 may be positioned anywhere on the valve core tool cap 30. According to one aspect, the valve cap threading is sized substantially equal to the threading of a tire stem such that a standard tire cap may threadedly couple to the valve cap threading 31.

One or more embodiments of a valve core tool cap 30 further comprise at least one finger grip 33. The at least one finger grip 33 may be positioned anywhere on the exterior of the valve core tool cap 30 and comprise any of a number of various shapes and configurations.

One or more embodiments of a tire sealant bottle assembly further comprise a indicator valve cap 40. The indicator valve cap 40 is configured to removably couple to at least one of the nozzle 20 or the valve core tool cap 30. In some non-limiting embodiments, the indicator valve cap 40 is configured to threadedly couple to the valve cap threading 31 on the valve core tool cap 30. The indicator valve cap 40 is typically also configured to threadedly couple to a tire stem such that the indicator valve cap 40 may be threadedly coupled to the tire stem after the tire sealant has been inserted into the tire. In one or more embodiments, the indicator valve cap 40 comprises a non-black color such as but not limited to yellow, red, blue, green, white, etc. Removably coupling a non-black indicator valve cap 40 to a tire stem after inserting tire sealant may remind the driver or mechanic that tire sealant has been inserted into the tire.

Also contemplated as part of this disclosure is a method of inserting tire sealant into a tire. According to one aspect, a method comprises removing a valve core from a tire stem of a tire. In more particular embodiments, removing the valve core from the tire stem comprises removing the valve core from the tire stem of the tire with a valve core removal tool 36 extending from a closed end 34 of a hollow valve core tool cap 30.

According to another aspect, a method comprises inserting a threaded portion of the tire stem into a substantially cylindrical portion 23, 53 of a channel 25, 55 in a nozzle head 24, 54 of a nozzle 20, 50. The nozzle 20, 50 typically comprises a nozzle base 22, 52 integral with the nozzle head 24, 54 and is removably coupled to a bottle 10 comprising the tire sealant housed therein.

According to another aspect, a method comprises transferring tire sealant from the bottle 10 through the nozzle base 22, 52, the nozzle head 24, 54, and the tire stem and into the tire by squeezing the bottle 10. A method may further comprise drawing air into the bottle 10 between the threaded portion of the tire stem and the cylindrical portion 23, 53 of the channel to replace the tire sealant previously housed within the bottle 10 and transferred into the tire with air from outside the bottle 10. According to another aspect, the nozzle head comprises a retractable nozzle head 54 and the method further comprises extending the retractable nozzle head 54.

It will be understood that implementations are not limited to the specific components disclosed herein, as virtually any components consistent with the intended operation of a method and/or system implementation for tire sealant bottle assemblies may be utilized. Accordingly, for example, although particular nozzles, bottles, and caps may be disclosed, such components may comprise any shape, size, style, type, model, version, class, grade, measurement, concentration, material, weight, quantity, and/or the like consistent with the intended operation of a method and/or system implementation for a tire sealant bottle assembly may be used.

In places where the description above refers to particular implementations of a tire sealant bottle assembly, it should be readily apparent that a number of modifications may be made without departing from the spirit thereof and that these implementations may be applied to other tire sealant bottle assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A tire sealant bottle assembly, comprising:
   a bottle comprising tire sealant housed therein and a bottle head;
   a nozzle comprising a nozzle base configured to removably couple to the bottle head, a nozzle head integral with the nozzle base and comprising a terminating end opposite the nozzle base, an inner surface within the nozzle forming a channel that extends through the terminating end, wherein the channel comprises a substantially cylindrical portion at the terminating end of the nozzle head and the substantially cylindrical portion comprises an inner diameter sized such that the inner surface of the cylindrical portion at least partially interfaces with threading of a tire stem when the tire stem is inserted into the substantially cylindrical portion of the nozzle head; and
   a valve core tool removably coupled to the nozzle head and comprising an open first end and a closed second end, the open first end encompassing the cylindrical portion of the nozzle head, the valve core tool further comprising a valve core removal tool extending from the closed second end away from the bottle.

2. The tire sealant bottle assembly of claim 1, wherein the valve core tool further comprises at least one finger grip on the open first end encompassing the cylindrical portion of the nozzle head.

3. The tire sealant bottle assembly of claim 1, further comprising a retainer ring on the nozzle head engaged with an annular depression on an inner surface of the valve core tool.

4. The tire sealant bottle assembly of claim 3, further comprising:
   valve cap threading positioned on the valve core tool between the closed second end and the valve core removal tool; and
   an indicator valve cap removably coupled to the valve cap threading of the valve core tool cap, the indicator valve cap configured to removably couple the tire stem.

5. The tire sealant bottle assembly of claim 4, further comprising one or more finger grips disposed on the valve core tool.

6. The tire sealant bottle assembly of claim 1, wherein the cylindrical portion of the channel is at least 5 mm in length.

7. The tire sealant bottle assembly of claim 6, wherein cylindrical portion of the channel is at least 3 cm in length and is uniform through the nozzle head.

8. The tire sealant bottle assembly of claim 6, wherein the nozzle head comprises a collapsible nozzle head.

9. The tire sealant bottle assembly of claim 1, wherein the inner diameter of the substantially cylindrical portion of the channel is between approximately 7 and 8 mm.

10. The tire sealant bottle assembly of claim 9, wherein the inner diameter of the substantially cylindrical portion of the channel is approximately 7.5-7.65 mm.

11. A tire sealant bottle assembly, comprising:
    a bottle comprising tire sealant housed therein and a bottle head;
    a nozzle removably coupled to the bottle head and comprising a nozzle base, a nozzle head integral with the nozzle base and comprising a terminating end opposite the nozzle base, and a channel extending through the nozzle, the channel comprising a substantially cylindrical portion at the terminating end that is at least 5 mm in length and comprises an inner diameter between approximately 7 and 8 mm; and
    a valve core tool removably coupled to the nozzle head and encompassing the terminating end of the nozzle head, the valve core tool comprising a valve core removal tool extending from the valve core tool away from the bottle.

12. The tire sealant bottle assembly of claim 11, wherein the valve core tool removably couples to the nozzle head through a raised portion on the nozzle head mating with a recess on an internal surface of the valve core tool.

13. The tire sealant bottle assembly of claim 11, further comprising a retainer ring on the nozzle head engaged with an annular depression on an inner surface of the valve core tool.

14. The tire sealant bottle assembly of claim 13, further comprising:
    valve cap threading positioned on the valve core tool adjacent the valve core removal tool; and
    an indicator valve cap removably coupled to the valve cap threading of the valve core tool, the indicator valve cap configured to removably couple the tire stem.

15. The tire sealant bottle assembly of claim 14, further comprising one or more finger grips disposed on the valve core tool.

16. The tire sealant bottle assembly of claim 11, wherein cylindrical portion of the channel is at least 3 cm in length and is uniform through the nozzle head.

17. The tire sealant bottle assembly of claim 11, wherein the nozzle head comprises a collapsible nozzle head.

18. The tire sealant bottle assembly of claim 11, wherein the inner diameter of the substantially cylindrical portion of the channel is approximately 7.5-7.65 mm.

19. A tire sealant bottle assembly, comprising:
    a bottle comprising tire sealant housed therein and a bottle head;
    a nozzle removably coupled to the bottle head and comprising a nozzle base, a nozzle head integral with the nozzle base and comprising a terminating end opposite the nozzle base, and a channel extending through the nozzle; and
    a valve core tool removably coupled to the nozzle head and encompassing the nozzle head, the valve core tool comprising a valve core removal tool extending from the nozzle head in a direction away from the bottle.

20. The tire sealant bottle assembly of claim 19, wherein the valve core tool is removably coupled to the nozzle head via a snap-fit coupling.

21. The tire sealant bottle assembly of claim 19, wherein the valve core tool further comprises at least one finger grip extending radially outward from the valve core tool at a portion of the valve core tool that encompasses the nozzle head.

\* \* \* \* \*